(12) United States Patent
Wang et al.

(10) Patent No.: US 12,303,074 B2
(45) Date of Patent: May 20, 2025

(54) CUSTOMIZED IDENTIFICATION OF INGREDIENTS IN A STORAGE SYSTEM

(71) Applicant: General Mills, Inc., Minneapolis, MN (US)

(72) Inventors: Wenyi Wang, Blaine, MN (US); Mark E. Arlinghaus, Minneapolis, MN (US)

(73) Assignee: General Mills, Inc., Minneapolis, MN (US)

( * ) Notice: Subject to any disclaimer, the term of this patent is extended or adjusted under 35 U.S.C. 154(b) by 95 days.

(21) Appl. No.: 18/129,689

(22) Filed: Mar. 31, 2023

(65) Prior Publication Data
US 2024/0324825 A1 Oct. 3, 2024

(51) Int. Cl.
*B60R 1/12* (2006.01)
*A47J 36/32* (2006.01)
(Continued)

(52) U.S. Cl.
CPC ............... *A47J 47/00* (2013.01); *A47J 36/32* (2013.01); *G08B 5/00* (2013.01)

(58) Field of Classification Search
USPC ......... 340/815.4, 691.1, 691.6, 825.27, 5.91, 340/7.52, 7.55, 10.42, 309.4, 330–332,
(Continued)

(56) References Cited

U.S. PATENT DOCUMENTS 6,153,253 A    11/2000  Affeldt et al.
8,276,505 B2 * 10/2012  Buehler .................. A47J 44/00
                                                99/348
(Continued)

FOREIGN PATENT DOCUMENTS

CN      107154042 B      2/2020
KR   10-2016-0092844 A    8/2016
(Continued)

OTHER PUBLICATIONS

Janos Simon et al., "Mass customization model in food industry using industry 4.0 standard with fuzzy-based multi-criteria decision making methodology", Advances in Mechanical Engineering, vol. 10(3), Issue 3, Mar. 2018; DOI: 10.1177/1687814018766776; journals.sagepub.com/home/ade; 10 pages.
(Continued)

*Primary Examiner* — Daniel Previl
(74) *Attorney, Agent, or Firm* — Faegre Drinker Biddle & Reath LLP (57) ABSTRACT

A method for use with an ingredient storage system having a plurality of receptacles configured to store ingredients can include obtaining food-selection data indicating a meal. The method can include obtaining ingredient data indicating a set of ingredients for the meal. The method can include obtaining synchronization data indicating a cooking time for each ingredient of the set of ingredients. The method can include selecting, based on the synchronization data, target ingredients for the meal. The target ingredients can comprise a first ingredient and a second ingredient. The method can include activating a first and a second indicator in response to the selecting the target ingredients. The first indicator can correspond to a first receptacle of the plurality of receptacles. The first receptacle can store the first ingredient. The second indicator can correspond to a second receptacle of the plurality of receptacles. The second receptacle can store the second ingredient.

20 Claims, 4 Drawing Sheets

(51) Int. Cl.
*A47J 47/00* (2006.01)
*G08B 5/00* (2006.01)

(58) Field of Classification Search
USPC .................................................. 340/815.45
See application file for complete search history.

(56) References Cited

U.S. PATENT DOCUMENTS

| | | | |
|---|---|---|---|
| 9,743,687 | B2 | 8/2017 | Davila et al. |
| 9,907,332 | B2 | 3/2018 | Davila et al. |
| 10,019,842 | B2 | 7/2018 | Boysen et al. |
| 10,426,188 | B2 | 10/2019 | Davila et al. |
| 10,455,096 | B2 | 10/2019 | Anderson et al. |
| 10,543,671 | B2 | 1/2020 | Davila et al. |
| 10,641,547 | B2 | 5/2020 | Cronin et al. |
| 10,771,638 | B2 | 9/2020 | Anderson et al. |
| 10,922,762 | B2 | 2/2021 | Carpenter et al. |
| 11,062,620 | B1* | 7/2021 | Wallace ............. G09B 19/0092 |
| 11,144,957 | B1 | 10/2021 | Raak et al. |
| 11,321,755 | B2 | 5/2022 | Anderson et al. |
| 2008/0249865 | A1 | 10/2008 | Angell et al. |
| 2010/0299600 | A1* | 11/2010 | Archer ................. G06F 1/1626 704/235 |
| 2011/0100504 | A1* | 5/2011 | Saranow .............. B01F 33/848 141/83 |
| 2011/0108569 | A1* | 5/2011 | Jones .................... A23G 9/228 222/1 |
| 2015/0363856 | A1 | 12/2015 | Rinicella et al. |
| 2015/0366219 | A1 | 12/2015 | Stork genannt Wersborg |
| 2017/0116580 | A1* | 4/2017 | Kim .................. G06Q 10/1095 |
| 2017/0345185 | A1 | 11/2017 | Byron et al. |
| 2018/0072555 | A1 | 3/2018 | Fortunato et al. |
| 2018/0284091 | A1 | 10/2018 | Levanon |
| 2020/0348077 | A1* | 11/2020 | Lee ........................ F25D 29/00 |
| 2020/0376826 | A1 | 12/2020 | Davila et al. |
| 2021/0093073 | A1* | 4/2021 | Saranow ................ A45D 2/122 |
| 2021/0241048 | A1 | 8/2021 | Rezaei et al. |
| 2022/0012519 | A1 | 1/2022 | Treboux et al. |
| 2022/0150088 | A1 | 5/2022 | Sagong et al. |
| 2022/0188948 | A1 | 6/2022 | Sagong et al. |
| 2022/0287498 | A1 | 9/2022 | Hua |
| 2022/0301033 | A1* | 9/2022 | Silva ......................... G06F 3/14 |
| 2022/0414864 | A1 | 12/2022 | Eichenlaub et al. |
| 2023/0346151 | A1* | 11/2023 | Shvets ................. A47J 27/004 |

FOREIGN PATENT DOCUMENTS

| | | |
|---|---|---|
| TW | 201706927 A | 2/2017 |
| TW | M597569 U | 7/2020 |
| WO | 2021130774 A1 | 7/2021 |
| WO | 2024148157 A1 | 7/2024 |

OTHER PUBLICATIONS

Meie Chao et al., "Data-Enriched Edible Pharmaceuticals (DEEP) with Bespoke Design, Dose and Drug Release", Pharmaceutics 2021, 13, 1866. https://doi.org/10.3390/pharmaceutics13111866, https://www.mdpi.com/journal/pharmaceutics, 12 pages.

M, Edinger et al., "QR encoded smart oral dosage forms by inkjet printing", International Journal of Pharmaceutics, vol. 536, Issue 1, Jan. 2018, pp. 138-135 (Abstract Only), 2 pages; https://www.scopus.com/inward/record.uri?eid=2-s2.0-85035789784&doi=10.1016%2fj.ijpharm.2017.11.052&partnerID=40&md5=13b6dd8dce1af1592c6f1b63a568873e.

Yu-Hsun Lin et al., "Appearance-Based QR Code Beautifier", IEEE Transactions on Multimedia, vol. 15. No. 8, Dec. 2013, pp. 2198-2207.

International Search Report and Written Opinion issued in PCT/US2024/010305, mailed Apr. 16, 2024, 18 pages.

\* cited by examiner

FIG. 1

FIG. 2

FIG. 3 though the single tools to assist consumers in locating food products (e.g., frozen meats and vegetables). In some instances, such tools can aid in locating categories of foods (e.g., a sign indicating dairy products or pastries), and in some instances, such tools can aid in locating a specific product (e.g., a mobile device software application specifying a particular aisle and shelf where a particular box of cereal may be found). However, these tools may be less effective for a consumer attempting to efficiently locate a set of food products to be cooked together to prepare a particular meal. For example, a consumer may wish to quickly locate a set of ingredients that can be baked together in an oven for a predetermined time to prepare a meal (e.g., a sheet pan meal). The consumer may further desire that the set of ingredients accord with the user's nutritional/dietary preferences (e.g., low sodium, organic, vegan, and the like). In this example, tools such as those described above would have a limited ability to assist the consumer.

To address these and other challenges, embodiments of the present disclosure utilize a product identification manager. In some embodiments, the product identification manager can identify ingredients stored in an ingredient storage system that satisfy user specifications (e.g., cuisine type, nutritional/dietary preferences, and the like). In some embodiments, the product identification manager can identify such ingredients based on synchronization data. Synchronization data can include information indicating a temperature and time for which a set of ingredients can be cooked together to reach a predetermined state (e.g., a minimum internal temperature and/or a predetermined appearance, flavor, and/or texture). Accordingly, embodiments of the present disclosure can permit a user to efficiently locate a set of food products that can be cooked together to prepare a meal tailored to the user's specifications. Additionally, embodiments of the present disclosure can permit a user to bundle a custom set of food products at a retail level.

Figure 1:
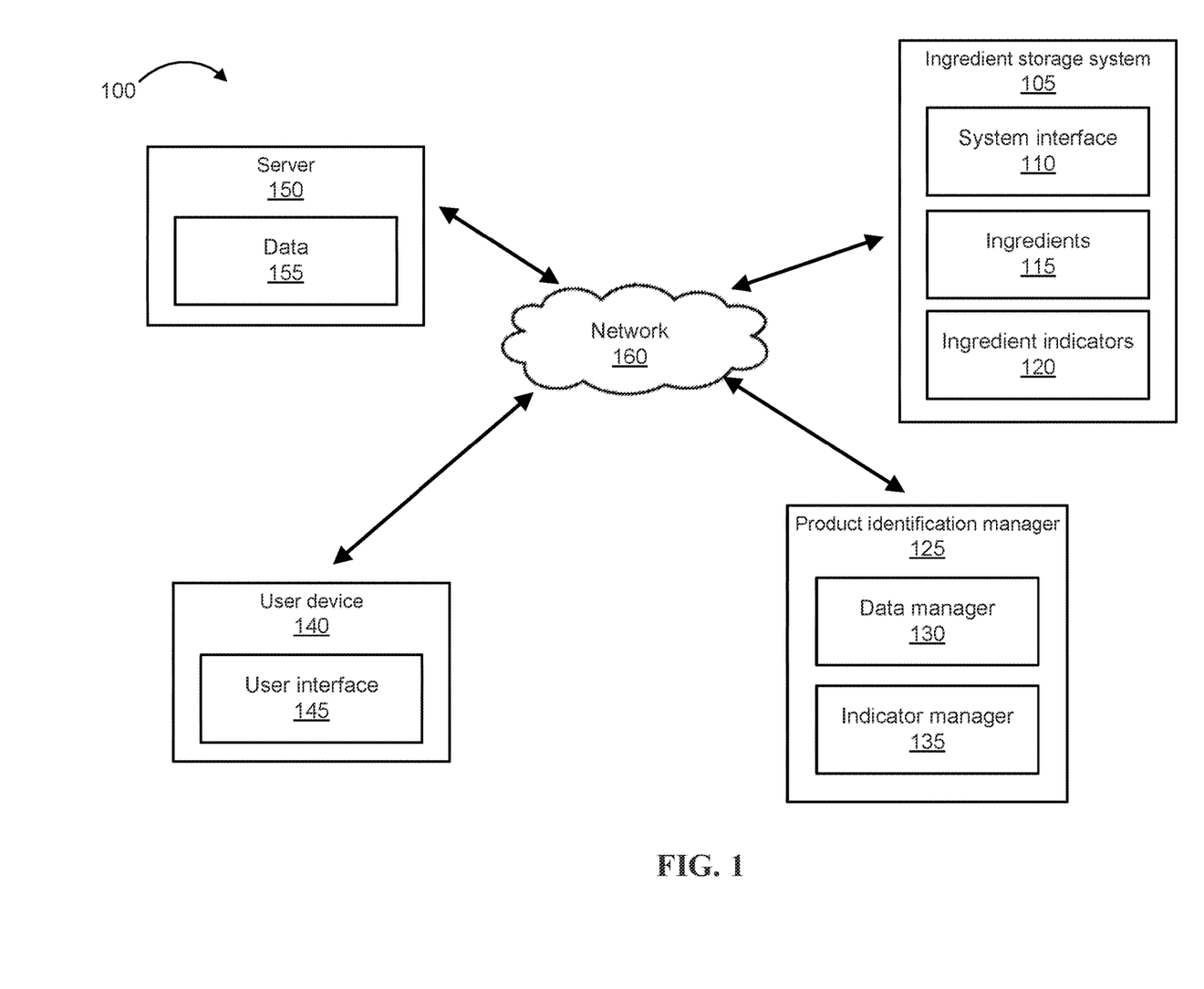

Turning to the figures, FIG. 1 illustrates a computing environment 100 that includes an ingredient storage system 105, a product identification manager 125, a user device 140, a server 150, and a network 160. In some embodiments, ingredient storage system 105, product identification manager 125, user device 140, and/or server 150 can exchange data through network 160. One or more of each of ingredient storage system 105, product identification manager 125, user device 140, server 150, and/or network 160 can include a computing device (e.g., illustrative computing device 400, FIG. 4).

In some embodiments, product identification manager 125 can be included in software installed on a computing device of at least one of ingredient storage system 105, server 150, and/or user device 140. For example, product identification manager 125 can be included as a software component of software installed on ingredient storage system 105. Product identification manager 125 can include program instructions implemented by a processor, such as a processor of ingredient storage system 105, to perform one or more operations discussed with respect to FIG. 3.

In some embodiments, product identification manager 125 can include one or more modules, such as data manager 130 and indicator manager 135. In some embodiments, data manager 130 and indicator manager 135 can be integrated into a single module. In some embodiments, data manager 130 can obtain and/or store data. In some embodiments, indicator manager 135 can analyze and/or interpret data. In some embodiments, indicator manager 135 can include natural language processing software for analyzing and interpreting voice and/or text data. In some embodiments, data manager 130 and/or indicator manager 135 can include program instructions implemented by a processor, such as a processor of ingredient storage system 105, to perform one or more operations discussed herein, including operations discussed with respect to FIG. 3. For example, in some embodiments, data manager 130 can include program instructions to perform operations 305-315, FIG. 3. In some embodiments, indicator manager 135 can include program instructions to perform operations 320-325, FIG. 3.

In some embodiments, ingredient storage system 105 can include a system interface 110 (e.g., a display, touchscreen, microphone, speaker, optical scanner (e.g., a barcode scanner) and/or keyboard) configured to obtain input from a user. For example, in some embodiments, a user can input food-selection data to the product identification manager by an optical code of a user device displayed to an optical scanner of the ingredient storage system 105, or by speech of the user uttered to a microphone of the ingredient storage system 105. Ingredient storage system 105 can be configured to store a set of ingredients 115 (e.g., food products). Ingredient storage system 105 includes ingredient indicators 120 (e.g., light-emitting diodes, speakers, and/or projectors) configured to provide an audible or visible indication of a storage location (e.g., a receptacle) where an ingredient is stored. Ingredient storage system 105 can be identical or substantially similar to ingredient storage system 200, FIG. 2.

In some embodiments, user device 140 can include a device such as a mobile phone, tablet, smartwatch, and the like. User device 140 can include a user interface 145 (e.g., a display, touchscreen, microphone, speaker, and/or keyboard). In some embodiments, server 150 can include a web server configured to store data 155 (e.g., food-selection data, ingredient data, and/or synchronization data). In some embodiments, network 160 can include a wide area network (WAN), a local area network (LAN), the internet, or an intranet. In some embodiments, network 160 can be bypassed to allow direct communication or hardware integration of one or more of server 150, ingredient storage system 105, user device 140, and product identification manager 125. For example, in some embodiments, a physical connector (e.g., a data cable) can be employed to physically attach a port of user device 140 (e.g., a mobile phone) to a port of ingredient storage system 105. Such a physical connector can permit the user device 140 to directly communicate with the ingredient storage system 105. In this example, a product identification manager 125 can be an installed software component of the ingredient storage system 105 and/or the user device 140 and can be configured to send and/or receive data by the physical connector.

Figure 2:
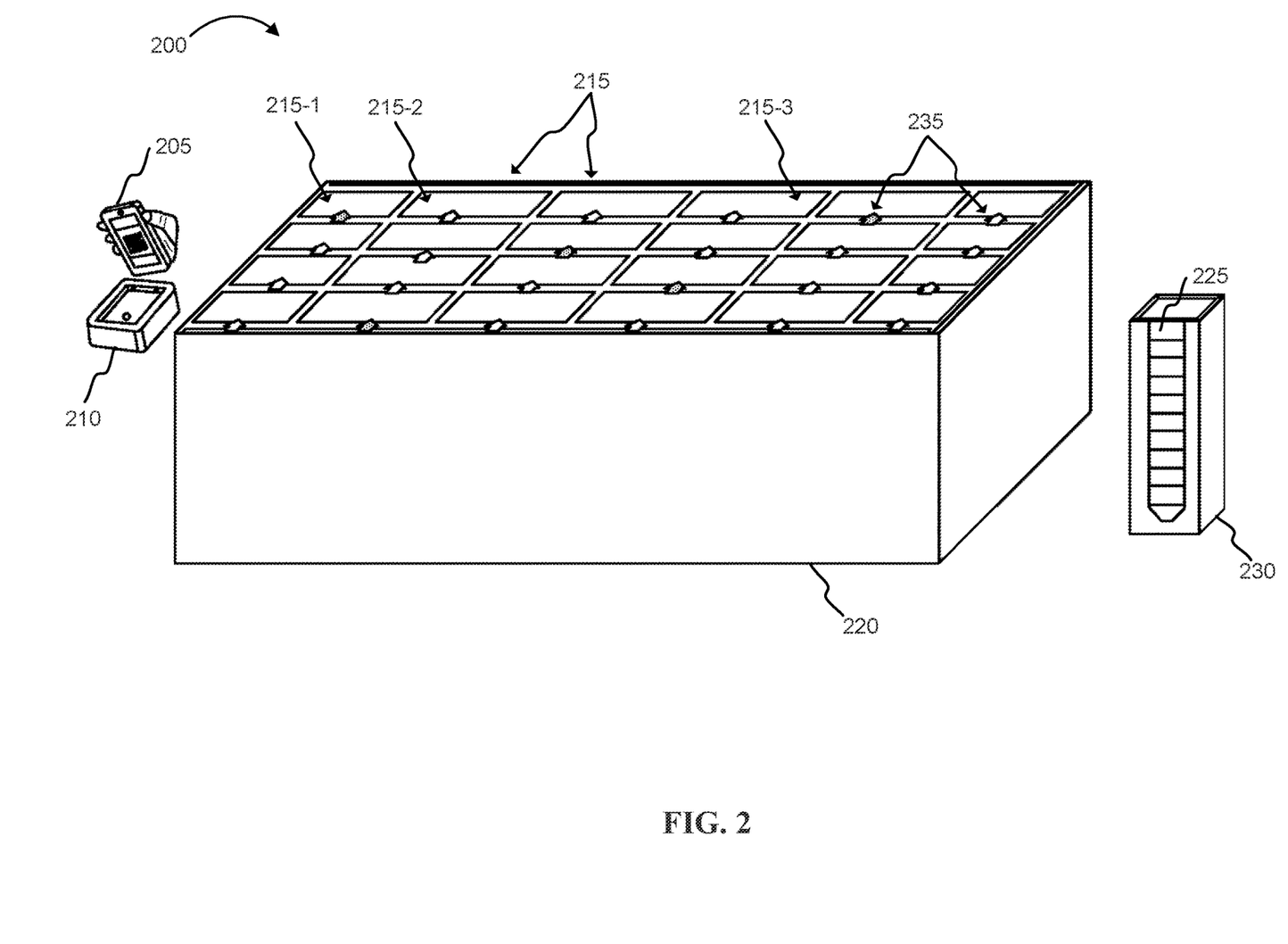

FIG. 2 illustrates an example ingredient storage system 200, in accordance with embodiments of the present disclosure. In some embodiments, ingredient storage system 200 can be identical or substantially similar to ingredient storage system 105, FIG. 1. Ingredient storage system 200 includes an interface, such as optical scanner 210, configured to obtain data (e.g., food-selection data) from a user. For example, ingredient storage system 200 can be configured to obtain such data from an optical code displayed on a user device 205 (e.g., mobile phone). Such an optical code can include optically encoded data (e.g., food-selection data) in the form of a machine-readable symbol (e.g., a barcode or a quick response code ("QR code")).

Ingredient storage system 200 includes storage structure 220 having a plurality of receptacles 215 for storing ingredients (e.g., unit food products 225). In some embodiments, ingredient storage system 200 can include a cooling system, such that one or more receptacles 215 can be configured to store food products at reduced temperatures (e.g., between approximately 4° C. to approximately −18° C.). In some embodiments, ingredient storage system 200 can be configured to store ingredients at approximately room temperature, refrigerated temperatures, and/or freezing temperatures. Ingredient storage system 200 further includes at least one receptacle structure 230 configured to vertically retain a set of ingredients (e.g., unit food products 225) within receptacles 215 of storage structure 220. In some embodiments, receptacle structure 230 can include a mechanical device (e.g., a spring or motor) configured to facilitate removal of unit food products 225 from receptacles 215. In some embodiments, a unit food product 225 can be a pre-packaged food from a particular production source. For example, in some instances unit food product 225 can be a bag of frozen potatoes produced and/or provided by a first company, and in some instances unit food product 225 can be a container of refrigerated chicken produced and/or provided by a second company. In some embodiments, storage structure 220 can store a plurality of ingredients from a plurality of production sources. For example, in some instances, a first receptacle 215-1 can store a plurality of packages of frozen broccoli provided by a first company; a second receptacle 215-2 can store a plurality of packages of frozen broccoli provided by a second company; and a third receptacle 215-3 can store a plurality of packages of *quinoa* provided by a third company. Ingredient storage system 200 further includes a set of indicators 235 (e.g., a set of light-emitting diodes) configured to illuminate and provide a visual indication of a receptacle 215 in which an ingredient is stored, in accordance with embodiments of the present disclosure.

FIG. 2 illustrates an example of an ingredient storage system having a horizontal arrangement of receptacles 215. In some embodiments of the present disclosure, the storage structure can be configured vertically, as opposed to horizontally. In such embodiments, the storage structure can include vertically arranged receptacles or shelves for storing and/or displaying unit food products vertically, in a manner similar to a book shelf or vending machine. In some embodiments, the ingredient storage system may not include a receptacle structure.

The use of an ingredient storage system, such as ingredient storage system 200 in accordance with embodiments of the present disclosure can improve a user's shopping experience and shopping efficiency. For example, a consumer who wishes to purchase ingredients for a sheet pan meal that satisfies the consumer's dietary restrictions can locate compliant food products efficiently by indicators 235 that identify locations of such compliant food products. Additionally, the ingredient storage system 200 can provide a centralized location for ingredients and facilitate a user's ability to acquire desired ingredients in reduced amount time.

Figure 3:
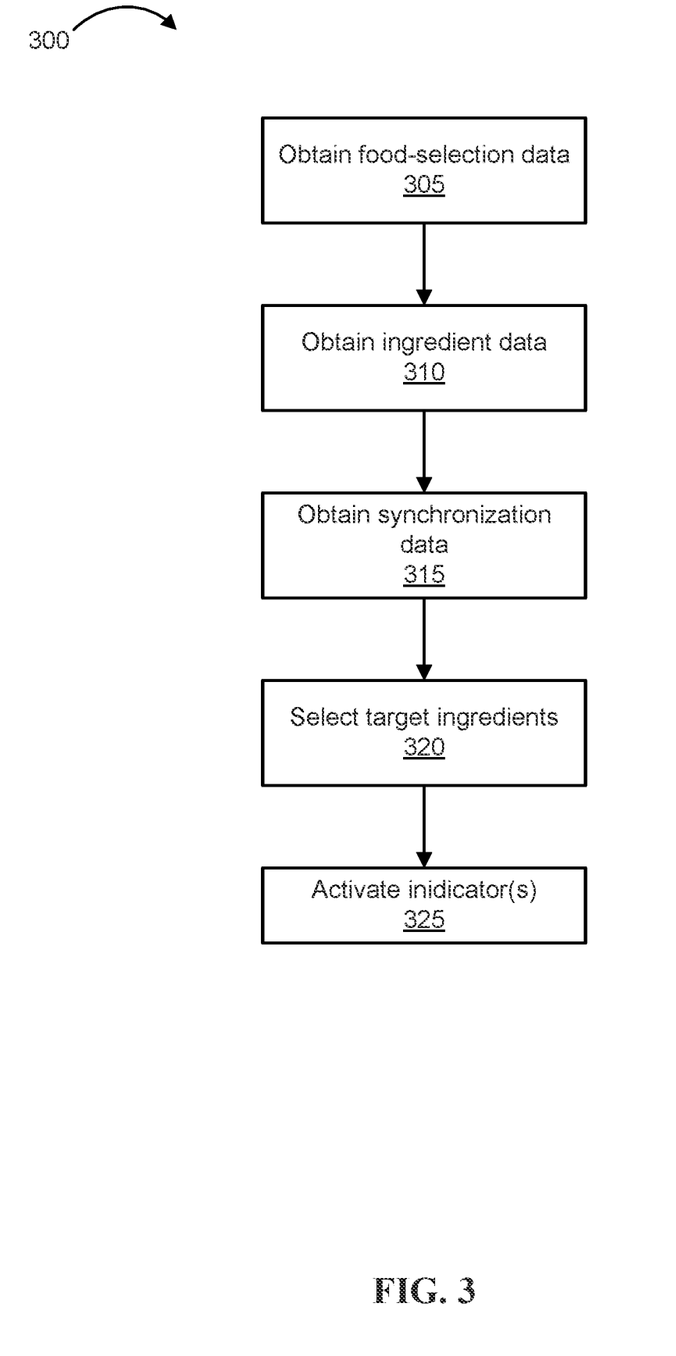

FIG. 3 illustrates a flowchart of an example method 300 for customized ingredient identification, in accordance with embodiments of the present disclosure. Method 300 can be performed by product identification manager 125, FIG. 1.

In operation 305, the product identification manager can obtain food-selection data. Food-selection data can include a user's criteria for choosing a set of food products. For example, in some embodiments, food-selection data can include a user's nutritional/dietary preferences (e.g., low sodium, organic, vegan, and the like). In some embodiments, food-selection data can include a type of cuisine (e.g., Italian, Chinese, Caribbean) desired by a user. In some embodiments, food-selection data can include one or more ingredients desired and/or not desired by a user. For example, in some instances, food-selection data can specify a chicken meal, a beef meal, or a pork and vegetable meal. Continuing with this example, in some instances, food-selection data can specify a pork and vegetable meal and include data from a user indicating that the user does not desire specific vegetables, such as peas and brussels sprouts. Further in this example, the food selection data can include data indicating that the user prefers a first set of spices and/or sauces with meals that include chicken and a different set of spices and/or sauces with meals that include beef. In some embodiments, food-selection data can include a name of a particular meal desired by a user, such as a "Beef and Bean Burrito Meal."

In some embodiments, food-selection data can indicate cooking preferences of a user. For example, in some instances, food selection data can include a preparation time selected by a user (e.g., a user can specify that the user has 45 minutes to prepare a meal). In some instances, food selection data can indicate a cooking ability of a user (e.g., a user can specify a number of times per week the user cooks). In some instances, food selection data can indicate cooking appliances available to the user (e.g., a user can specify whether the user can access one or more of a microwave, a stove, and an oven). In such embodiments, the product identification manager can select target ingredients based, at least in part, on whether ingredients can be cooked with the available cooking appliances (e.g., the product identification manager can select microwaveable ingredients in a case where a user specifies access only to a microwave).

In operation 305, the product identification manager can obtain food-selection data through an interface, such as an interface of a user device (e.g., user device 140, FIG. 1) or an interface of an ingredient storage system (e.g., ingredient storage system 105, FIG. 1). In some embodiments, the product identification manager can obtain food-selection data from a user device or a server through a network or a physical connector.

In operation 310, the product identification manager can obtain ingredient data. Ingredient data can include information that correlates a meal or cuisine name with a list of ingredients that can be cooked together to prepare the meal or cuisine. For example, ingredient data can correlate "chicken skewer meal" with ingredients such as chicken, onions, potatoes, and green beans. In some embodiments, ingredient data can include an indication of ingredients and/or food products stored in an ingredient storage system as well as nutritional data of the stored ingredients and/or food products. In these embodiments, the ingredient data can further include an indication of the storage location of the ingredients and/or food products within the ingredient storage system. In operation 310, the product identification manager can obtain ingredient data from a storage location, such as from memory of a server (e.g., a web server).

In operation 315, the product identification manager can obtain synchronization data. Synchronization data can include information indicating a temperature and time for which a set of ingredients can be cooked together to reach a predetermined state (e.g., a minimum internal temperature and/or a predetermined appearance, flavor, and/or texture). In some embodiments, synchronization data can include an indication (e.g., a brand name) of a production source for the ingredient. For example, in some embodiments, synchronization data can include a time (e.g., a duration for heating ingredients in an oven) and a temperature (e.g., an oven temperature) for cooking a set of ingredients together, such as frozen beef strips produced by "Company A," frozen sweet potatoes produced by "Company B," and frozen brussels sprouts produced by "Company C." In some embodiments, synchronization data can include a first cooking time and first cooking temperature for a first food product and a second cooking time and second cooking temperature for a second food product.

In some embodiments, synchronization data can be predetermined by a third-party entity that can cook a variety sets of food products (e.g., a variety of ingredients produced by a variety of entities) together at a range of temperatures and times. Additionally, for each temperature and time, the third-party entity can rank each set of food products according to metrics such as texture, color, and/or flavor. Based on such metrics, the third-party entity can define synchronization data for a plurality of sets of food products. In an example, for a particular set of food products, a cooking time and cooking temperature yielding the highest rankings among the ranking data for texture, color, and/or flavor can be selected by the third-party entity as synchronization data for the set of food products. The third-party entity can store synchronization data to a data storage location, such as a web server.

In operation 315, the product identification manager can obtain synchronization data from a storage location, such as from memory of a computing device of an ingredient storage system and/or from memory of a server (e.g., a web server).

In operation 320, the product identification manager can select a set of target ingredients. A set of target ingredients can refer to a set of food products stored in an ingredient storage system. In some embodiments, the product identification manager can select the set of target ingredients based, at least in part, on synchronization data obtained in operation 315. For example, the product identification manager can select a set of food products based on each food product's synchronization data indicating a cooking time of 35 minutes and a cooking temperature of 175° C. In some embodiments, the product identification manager can select a set of food products based on each food product's synchronization data indicating a cooking time within a range, such as 30 to 40 minutes and a cooking temperature within a range of 165° C. to 185° C. In some embodiments, the product identification manager can select the set of target ingredients based, at least in part, on ingredient data obtained in operation 310, such as data indicating that the ingredients can be cooked together to prepare a particular meal or cuisine. In some embodiments, the product identification manager can select the set of target ingredients based, at least in part, on the food-selection data obtained in operation 305, such that the selected target ingredients satisfy one or more user preferences and/or user cooking ability.

In operation 325, the product identification manager can activate one or more indicators of the ingredient storage system corresponding to the set of target ingredients selected in operation 320. For example, in some instances, the set of target ingredients can include a bag of frozen vegetables from a first production source stored in a first receptacle of the ingredient storage system and a container of frozen fish from a second production source stored in a second receptacle of the ingredient storage system. In this example, operation 325 can include the product identification manager issuing an instruction to the ingredient storage system to illuminate indicators (e.g., lights) corresponding to the first receptacle and the second receptacle. In some embodiments, operation 325 can include modifying a characteristic (e.g., a color or illumination intensity) of an indicator.

Figure 4:
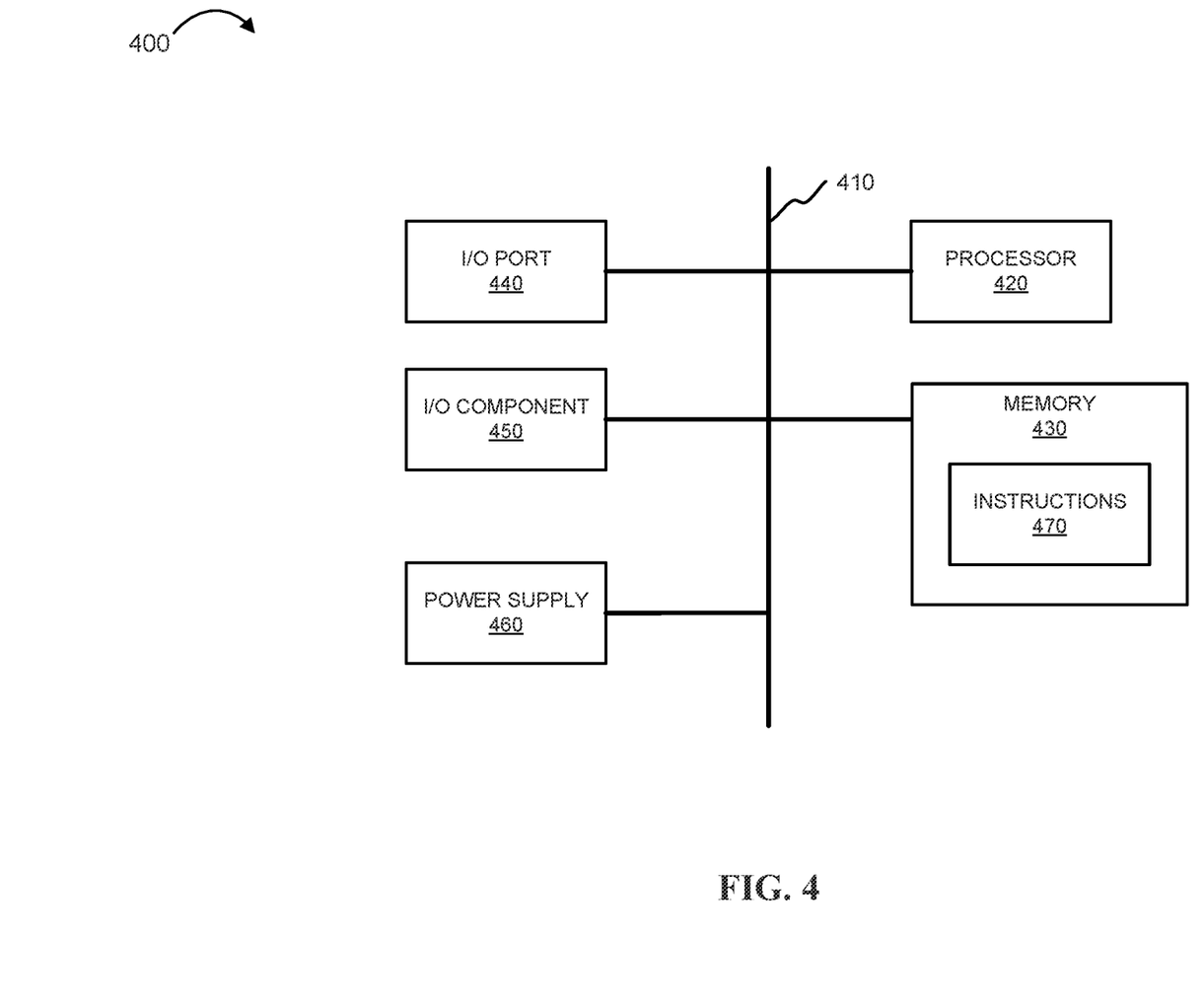

FIG. 4 is a block diagram depicting an illustrative computing device 400, in accordance with embodiments of the disclosure. The computing device 400 may include any type of computing device suitable for implementing aspects of embodiments of the disclosed subject matter. Each of the various components shown and described in the Figures can contain their own dedicated set of computing device components, such as those shown in FIG. 4 and described below. For example, ingredient storage system 105, FIG. 1 and user device 140, FIG. 1 can each include a set of components shown in FIG. 4 and described below.

In embodiments, the computing device 400 includes a bus 410 that, directly and/or indirectly, couples one or more of the following devices: a processor 420, a memory 430, an input/output (I/O) port 440, an I/O component 450, and a power supply 460. Any number of additional components, different components, and/or combinations of components may also be included in the computing device 400.

The bus 410 represents what may be one or more busses (such as, for example, an address bus, data bus, or combination thereof). Similarly, in embodiments, the computing device 400 may include a number of processors 420, a number of memory components 430, a number of I/O ports 440, a number of I/O components 450, and/or a number of power supplies 460. Additionally, any number of these components, or combinations thereof, may be distributed and/or duplicated across a number of computing devices.

In embodiments, the memory 430 includes computer-readable media in the form of volatile and/or nonvolatile memory and may be removable, nonremovable, or a combination thereof. Media examples include random access memory (RAM); read only memory (ROM); electronically erasable programmable read only memory (EEPROM); flash memory; optical or holographic media; magnetic cassettes, magnetic tape, magnetic disk storage or other magnetic storage devices; data transmissions; and/or any other medium that can be used to store information and can be accessed by a computing device. In embodiments, the memory 430 stores computer-executable instructions 470 for causing the processor 420 to implement aspects of embodiments of components discussed herein and/or to perform aspects of embodiments of methods and procedures discussed herein. The memory 430 can comprise a non-transitory computer readable medium storing the computer-executable instructions 470.

The computer-executable instructions 470 may include, for example, computer code, machine-useable instructions, and the like such as, for example, program components capable of being executed by one or more processors 420 (e.g., microprocessors) associated with the computing device 400. Program components may be programmed using any number of different programming environments, including various languages, development kits, frameworks, and/or the like. Some or all of the functionality contemplated herein may also, or alternatively, be implemented in hardware and/or firmware.

According to embodiments, for example, the instructions 470 may be configured to be executed by the processor 420 and, upon execution, to cause the processor 420 to perform certain processes. In certain embodiments, the processor 420, memory 430, and instructions 470 are part of a controller such as an application specific integrated circuit (ASIC), field-programmable gate array (FPGA), and/or the like. Such devices can be used to carry out the functions and steps described herein.

The I/O component 450 may include a presentation component configured to present information to a user such as, for example, a display device, a speaker, and/or the like, and/or an input component such as, for example, a microphone, a joystick, a satellite dish, a wireless device, a keyboard, a pen, a voice input device, a touch input device, a touch-screen device, an interactive display device, a mouse, and/or the like.

The devices and systems described herein can be communicatively coupled via a network, which may include a local area network (LAN), a wide area network (WAN), a cellular data network, via the internet using an internet service provider, and the like.

Aspects of the present disclosure are described with reference to flowchart illustrations and/or block diagrams of methods, devices, systems and computer program products. It will be understood that each block of the flowchart illustrations and/or block diagrams, and combinations of blocks in the flowchart illustrations and/or block diagrams, can be implemented by computer program instructions.

Various modifications and additions can be made to the exemplary embodiments discussed without departing from the scope of the disclosed subject matter. For example, while the embodiments described above refer to particular features, the scope of this disclosure also includes embodiments having different combinations of features and embodiments that do not include all of the described features. Accordingly, the scope of the disclosed subject matter is intended to embrace all such alternatives, modifications, and variations as fall within the scope of the claims, together with all equivalents thereof.

We claim:

1. A method for use with an ingredient storage system having a plurality of receptacles configured to store ingredients, the method comprising:
   obtaining food-selection data of a user, the food-selection data indicating a meal;
   obtaining, based on the food-selection data, ingredient data indicating a set of ingredients for the meal;
   obtaining synchronization data indicating a cooking time for each ingredient of the set of ingredients;
   selecting, based at least in part on the synchronization data, target ingredients for the meal, the target ingredients comprising a first ingredient and a second ingredient, wherein the synchronization data indicates a first cooking time for the first ingredient and a second cooking time for the second ingredient, and wherein the selecting the target ingredients comprises determining that the first cooking time is within a predetermined range of the second cooking time; and
   in response to the selecting the target ingredients:
   activating a first indicator corresponding to a first receptacle of the plurality of receptacles, the first receptacle storing the first ingredient; and
   activating a second indicator corresponding to a second receptacle of the plurality of receptacles, the second receptacle storing the second ingredient.

2. The method of claim 1, wherein the first receptacle is configured to store a plurality of units of the first ingredient.

3. The method of claim 2, wherein the second receptacle is configured to store a plurality of containers with the second ingredient.

4. The method of claim 1, wherein the obtaining the food-selection data comprises reading, by an optical device of the ingredient storage system, an optical code displayed on a user device.

5. The method of claim 4, wherein the optical code is a quick response code.

6. The method of claim 1, wherein the activating the first indicator comprises modifying a visual indicator corresponding to the first receptacle.

7. The method of claim 1, wherein the activating the first indicator comprises initiating an audible indicator corresponding to the first receptacle.

8. The method of claim 1, wherein the obtaining the food-selection data comprises obtaining speech data corresponding to speech of the user.

9. The method of claim 1, wherein the first ingredient is stored in containers in the first receptacle, wherein the containers are stacked vertically in the first receptacle.

10. A system comprising: an ingredient storage system having a plurality of receptacles configured to store ingredients; one or more processors; and one or more computer-readable storage media storing program instructions which, when executed by the one or more processors, are configured to cause the one or more processors to perform a method comprising:
    obtaining food-selection data of a user, the food-selection data indicating a meal;
    obtaining, based on the food-selection data, ingredient data indicating a set of ingredients for the meal;
    obtaining synchronization data indicating a cooking time for each ingredient of the set of ingredients;
    selecting, based at least in part on the synchronization data, target ingredients for the meal, the target ingredients comprising a first ingredient and a second ingredient, wherein the synchronization data indicates a first cooking time for the first ingredient and a second cooking time for the second ingredient, and wherein the selecting the target ingredients comprises determining that the first cooking time is within a predetermined range of the second cooking time; and
    in response to the selecting the target ingredients:
    activating a first indicator corresponding to a first receptacle of the plurality of receptacles, the first receptacle storing the first ingredient; and
    activating a second indicator corresponding to a second receptacle of the plurality of receptacles, the second receptacle storing the second ingredient.

11. The system of claim 10, wherein the first receptacle is configured to store a plurality of units of the first ingredient.

12. The system of claim 10, wherein the obtaining the food-selection data comprises reading, by an optical device of the ingredient storage system, an optical code displayed on a user device.

13. The system of claim 10, wherein the activating the first indicator comprises modifying a visual indicator corresponding to the first receptacle.

14. The system of claim 10, wherein the activating the first indicator comprises initiating an audible indicator corresponding to the first receptacle.

15. The system of claim 10, wherein the plurality of receptacles is arranged vertically.

16. A computer program product comprising one or more non-transitory computer readable storage media, and program instructions collectively stored on the one or more non-transitory computer readable storage media, the program instructions comprising instructions configured to cause one or more processors to perform a method for use with an ingredient storage system having a plurality of receptacles configured to store ingredients, the method comprising:
    obtaining food-selection data of a user, the food-selection data indicating a meal;

obtaining, based on the food-selection data, ingredient data indicating a set of ingredients for the meal;

obtaining synchronization data indicating a cooking time for each ingredient of the set of ingredients;

selecting, based at least in part on the synchronization data, target ingredients for the meal, the target ingredients comprising a first ingredient and a second ingredient, wherein the synchronization data indicates a first cooking time for the first ingredient and a second cooking time for the second ingredient, and wherein the selecting the target ingredients comprises determining that the first cooking time is within a predetermined range of the second cooking time; and in response to the selecting the target ingredients:

activating a first indicator corresponding to a first receptacle of the plurality of receptacles, the first receptacle storing the first ingredient; and activating a second indicator corresponding to a second receptacle of the plurality of receptacles, the second receptacle storing the second ingredient.

17. The computer program product of claim 16, wherein the first receptacle is configured to store a plurality of units of the first ingredient.

18. The computer program product of claim 16, wherein the obtaining the food-selection data comprises reading, by an optical device of the ingredient storage system, an optical code displayed on a user device.

19. The computer program product of claim 16, wherein the activating the first indicator comprises modifying a visual indicator corresponding to the first receptacle.

20. The computer program product of claim 16, wherein the plurality of receptacles is arranged horizontally.

* * * * *